US010136036B2

United States Patent
Osborne et al.

(10) Patent No.: US 10,136,036 B2
(45) Date of Patent: *Nov. 20, 2018

(54) CONTROL FLAP

(71) Applicant: Lenovo (Singapore) Pte. Ltd., Singapore (SG)

(72) Inventors: Christopher Miles Osborne, Cary, NC (US); David Wayne Hill, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,499

(22) Filed: Nov. 9, 2015

(65) Prior Publication Data

US 2016/0065806 A1   Mar. 3, 2016

Related U.S. Application Data

(63) Continuation of application No. 13/938,090, filed on Jul. 9, 2013, now Pat. No. 9,185,275.

(51) Int. Cl.
*H04N 5/225* (2006.01)
*H04N 5/232* (2006.01)

(52) U.S. Cl.
CPC ......... *H04N 5/2252* (2013.01); *H04N 5/232* (2013.01); *H04N 5/23216* (2013.01)

(58) Field of Classification Search
USPC ...................................................... 396/448
See application file for complete search history.

(56) References Cited

U.S. PATENT DOCUMENTS

| 8,780,205 | B2 * | 7/2014 | Boutell | G03B 11/048 348/158 |
| 9,185,275 | B2 * | 11/2015 | Osborne | H04N 5/2252 |
| 2003/0053538 | A1 * | 3/2003 | Katsavounidis | H03M 7/30 375/240.01 |
| 2004/0185798 | A1 * | 9/2004 | Ohtaki | G07C 9/00944 455/90.3 |
| 2008/0270900 | A1 * | 10/2008 | Wezowski | G06F 3/0238 715/702 |
| 2009/0075692 | A1 * | 3/2009 | Park | H04M 1/0233 455/556.1 |

(Continued)

*Primary Examiner* — Clayton E Laballe
*Assistant Examiner* — Linda B Smith
(74) *Attorney, Agent, or Firm* — Brian J. Pangrle

(57) ABSTRACT

An apparatus can include a processor; memory; a touchscreen display; a network interface; a camera that includes a lens; an operating system executable by the processor to establish an operating system environment; applications that execute within the operating system environment to establish corresponding application states where the applications include a camera application to establish a camera state; a housing that houses at least the processor and the camera and that includes a surface where the surface includes an opening for the lens of the camera; a cover that includes a flap where the flap includes a closed orientation with respect to the opening and an open orientation with respect to the opening; and circuitry that switches from an existing application state to the camera state responsive to a transition of the flap from the closed orientation to the open orientation.

20 Claims, 12 Drawing Sheets

(56) References Cited

U.S. PATENT DOCUMENTS

| | | | |
|---|---|---|---|
| 2010/0022277 A1* | 1/2010 | An | H04M 1/72527 455/566 |
| 2010/0220192 A1* | 9/2010 | Cirker | G03B 11/00 348/151 |
| 2012/0112031 A1* | 5/2012 | Gormick | A45C 11/00 248/371 |
| 2012/0308981 A1* | 12/2012 | Libin | G09B 3/00 434/362 |
| 2014/0085543 A1* | 3/2014 | Hartley | H04N 9/87 348/584 |
| 2014/0133836 A1* | 5/2014 | Burns | G11B 27/10 386/278 |
| 2014/0267060 A1* | 9/2014 | Li | G06F 3/0416 345/173 |
| 2014/0333831 A1* | 11/2014 | Oh | H04N 5/2254 348/376 |
| 2015/0077326 A1* | 3/2015 | Kramer | G06F 3/0325 345/156 |
| 2015/0229746 A1* | 8/2015 | Bergin | H04M 1/185 455/556.1 |

\* cited by examiner

CONTROL FLAP

RELATED APPLICATION

This application is a continuation of a U.S. patent application having Ser. No. 13/938,090, filed 9 Jul. 2013 (issued 10 Nov. 2015 as U.S. Pat. No. 9,185,275), which is incorporated by reference herein.

TECHNICAL FIELD

Subject matter disclosed herein generally relates to circuit control.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Various mobile devices include a camera or cameras. Various technologies and techniques described herein pertain to circuit control, for example, related to a camera or cameras.

SUMMARY

An apparatus can include a processor; memory operatively coupled to the processor; a display operatively coupled to the processor; a camera that includes a lens, an active state and a dormant state; a housing that houses at least the processor and the camera and that includes a surface where the surface comprises an aperture aligned with the lens of the camera; a flap where, in a first orientation, the flap covers the aperture and where, in a second orientation, the flap exposes the aperture; and circuitry that can determine the state of the camera based on the orientation of the flap. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
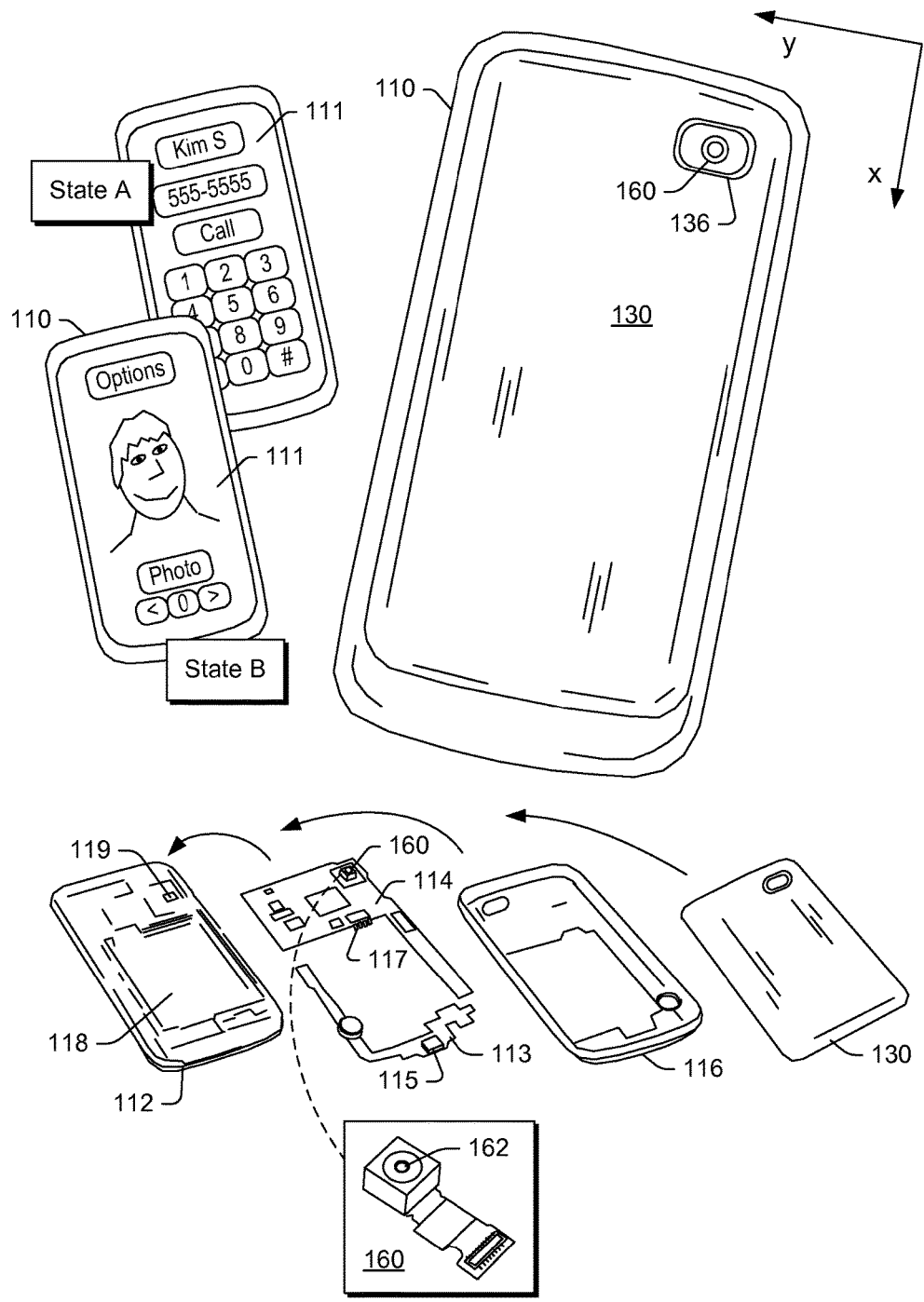
FIG. 1 is a diagram of an example of a mobile device and associated circuitry.

FIG. 1 shows an example of a mobile device 110 that includes a display 111, which may be a touch display (e.g., a touchscreen display) for input of information (e.g., via a key pad, control graphics, etc.) and output of information, for example, with a resolution of about 1280×720 pixels (e.g., with a density of about 300 pixels per inch). As shown, the mobile device 110 includes various components including a first frame component 112 (e.g., a display frame component) with a battery bay 118 and display graphics circuitry 119 (e.g., optionally including touch and gesture circuitry). As shown, the first frame component 112 can receive circuitry components 113 and 114, which may carry items such as a camera 160 (e.g., configured for capturing still images, video, etc.), optionally auto-focus circuitry, optionally a flash for flash photography/videography, a SIM slot, a main processor, audio circuitry (e.g., for notifications such as ringtones, etc.), power management circuitry, motion processing circuitry (e.g., accelerometer, gyroscope), modem circuitry, pressure sensor circuitry, multiband power amplification circuitry, memory (e.g., SDRAM, etc.), wireless LAN circuitry, smart card circuitry, transmitter circuitry, and GPS circuitry. As to the main processor, a single or multi-core processor may be provided, for example, as a chip that may include memory (e.g., RAM and optionally other memory). In the example of FIG. 1, the circuitry component 113 includes a connector 115 (e.g., for power and information) and the circuitry component 114 includes a connector 117 for connecting a battery disposed at least partially in the bay 118. A second frame component 116 may fit to the first frame component 112, for example, to protect the circuitry components 113 and 114 as seated with respect to the first frame component 112. A cover 130 (e.g., a back side component of a housing) may fit to the second frame component 116 and include an aperture 136 (e.g., an opening or window) aligned with the camera 160. As an example, a window may include a transparent material, for example, set in a frame, etc. As an example, the cover 130 may include a removable panel, for example, for access to the battery bay 118 and, for example, a SIM slot, memory, etc.

FIG. 1 shows the camera 160 as including wires, a connector, optional in-line memory (e.g., buffer memory) and a lens 162. As an example, a lens may be an optical component and may be optionally configured for zooming (e.g., via optical zoom circuitry). As an example, a lens may be made of a hard material resistant to scratching (e.g., a hardened polymeric material, a glass, sapphire, etc.). As an example, a camera may be rated in terms of mega-pixels. As an example, a camera may include a CMOS sensor, a CCD sensor or other type of sensor. As an example, the device 110 may optionally include circuitry for one or more of autofocus, panorama photography, digital zoom, flash (e.g., xenon or other type of flash), geo-tagging, touch focus, face and smile detection, optical image stabilization, video recording support, etc. As an example, the device 110 may include a microphone or microphones. As an example, circuitry may couple video and audio for audio-video recording. As an example, the device 110 may include drivers (e.g., driver circuitry) for operatively coupling a processor to various components (e.g., camera, optical zoom, flash, microphone, etc.). As an example, the device 110 may include multiple cameras, for example, a front side camera and a back side camera, stereo-cameras, etc.

As an example, the device 110 of FIG. 1 may be configured to operate in various operational states. For example, a phone state (State A) may allow a user to make and receive phone calls and a camera state (State B) may allow a user to take a photo, record video, etc. As an example, the device 110 may include an operating system as instructions stored in memory and executable by a processor to establish an operating system environment. As an example, one or more applications, provided as instructions stored in memory, may execute within an operating system environment, for example, to provide for one or more operational states. For example, a camera application may execute to provide the camera state (State B) and a phone application may execute to provide the phone state (State A). As another example, a browser application may execute to provide for browsing the Internet (e.g., State C).

As the device 110 may be "multi-functional", a user may wish to readily switch between one operational state and another. For example, a user may be at home browsing the Internet on a mobile device while taking care of a child. In such an example, upon seeing the child acting "cute", the user may wish to capture the moment with a photo, a video, etc. To do so for the particular mobile device in this example, the user must switch from the browsing state of the mobile device to a camera state of the mobile device. If such a switch cannot be made quickly, the moment may be gone. Loss of that "special" moment may be quite disappointing for the user. In such a circumstance, a mechanism to quickly switch from one state to another may enhance user experience and add value. As an example, such a mechanism may include logic, for example, to override an existing state, at least for a period of time sufficient to "capture a moment" with a photo, take a video, etc. (e.g., for a time period of about 5 seconds or more). As an example, a mechanism may provide for return to that existing state, for example, responsive to one or more actions (e.g., sensing, receipt of a signal, expiration of a time period, etc.).

Figure 2:
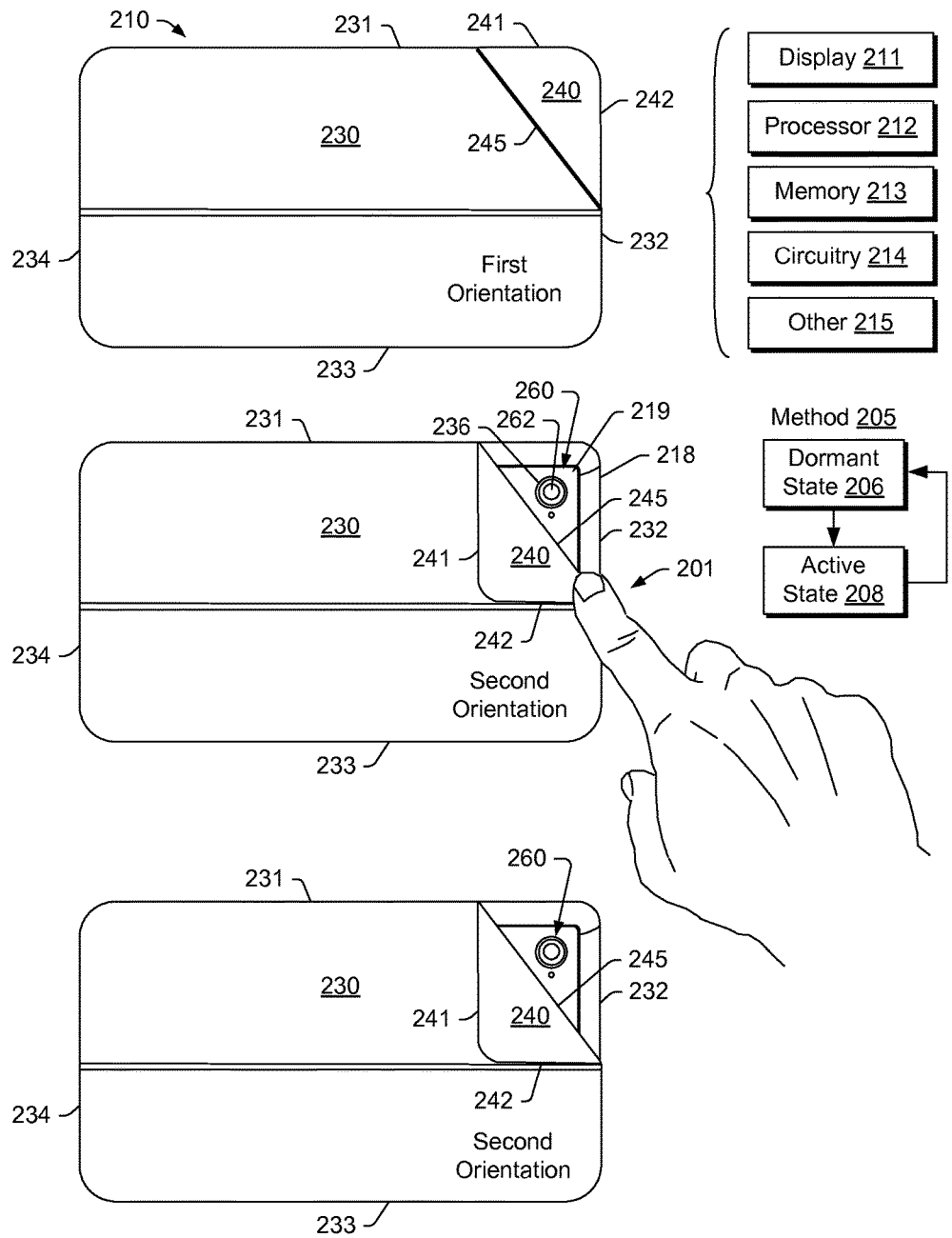
FIG. 2 is a diagram of an example of a mobile device that includes an example of flap.

FIG. 2 shows an example of a method 205 and an example of a device 210 that includes a mechanism, for example, to activate camera circuitry. As shown in the example of FIG. 2, the device 210 include a display 211, a processor 212 where the display 211 is operatively coupled to the processor 212, memory 213 operatively coupled to the processor 212, a camera 260 that includes a lens 262 (e.g., where the camera 260 may be in an active state or a dormant state); and a housing 218 that houses at least the processor 212 and the camera 260 and that includes a surface 219 where the surface 219 includes an aperture 236 aligned with the lens 262 of the camera 260. As shown in the example of FIG. 2, the mechanism includes a flap 240 and circuitry 214 where, in a first orientation, the flap 240 covers the aperture 236 and where, in a second orientation, the flap 240 exposes the aperture 236 and where the circuitry 214 can determine the state of the camera 260 based on the orientation of the flap 240. For example, the method 205 includes a dormant block 206 where the camera 260 (e.g., camera circuitry) is in a dormant state and an active block 208 where the camera 260 (e.g., camera circuitry) is in an active state. The method 205 can include transitioning from one state to another with respect to the camera 206, and optionally other circuitry of the device 210, for example, based at least in part on the orientation of the flap 240 (e.g., active to dormant upon closing the flap 240 and dormant to active upon opening the flap 240).

In the example of FIG. 2, a cover 230 may be provided, for example, where the cover 230 includes the flap 240, for example, as a corner flap. For example, a flap may have an approximately triangular shape (e.g., include three legs). As an example, the cover 230 can include edges 231, 232, 233 and 234 and the flap 240 can includes edges 241 and 242 as well as a hinge 245 (e.g., which may define legs of an approximately triangular shape of the flap 240). In such an example, the flap 240 includes a corner (e.g., curved corner, other shaped "corner" such as a notched corner, etc.) formed by the edges 241 and 242. As an example, the flap 240 may flip (e.g., rotate) about the hinge 245 such that the corner rotates by approximately 180 degrees.

As an example, the hinge 245 may be formed in part by a piece of material that "locks" in an approximately 0 degree orientation (e.g., closed) and in an approximately 180 degree orientation (e.g., open). Such material may be elastically deformable by application of force, for example, applied by a finger 201 of a human hand. As an example, such material may extend into or be fixed to the flap 240 and into or be fixed to another portion to allow for hinged swinging of the flap 240 (e.g., a portion of a cover, a portion of a housing, etc.).

As an example, the flap 240 may "snap" to its first orientation and "snap" to its second orientation. As an example, one or more of the device 210, the cover 230 and the flap 240 may include a portion of a catch or fastening mechanism for the flap 240 (e.g., a snap, VELCRO® material, magnetic material, etc.).

Figure 3:
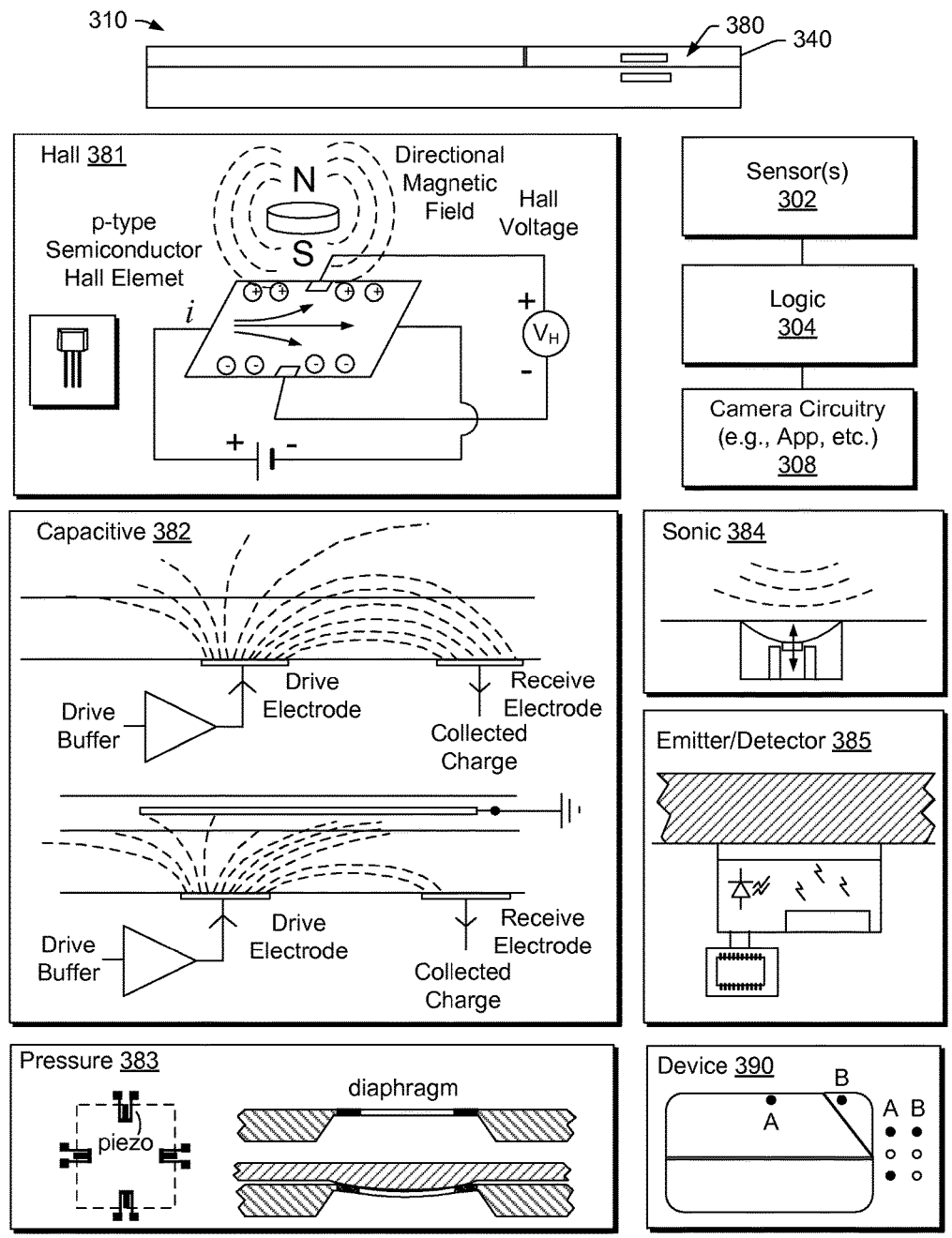
FIG. 3 is a diagram of examples of circuitry.

FIG. 3 shows an example of a device 310 that includes a flap 340 and sensor circuitry 380, for example, to determine an orientation of the flap 340, which may, for example, determine a state of a camera of the device 310. As an example, the sensor circuitry 380 may include one or more of a Hall sensor, a capacitive sensor, a pressure sensor, a sonic sensor, an emitter/detector sensor, etc.

FIG. 3 shows an example of a Hall sensor 381, an example of a capacitive sensor 382, an example of a pressure sensor 383, an example of a sonic sensor 384 and an example of an emitter/detector sensor 385. As an example, a respective portion of such sensors may include a probe or be considered a probe, for example, where the probe is operatively coupled to sensor circuitry. For example, the Hall sensor 381 may include a Hall element as a probe, the capacitive sensor 382 may include electrodes as a probe, the pressure sensor 383 may include a diaphragm as a probe, the sonic sensor 384 may include a microphone as a probe and the emitter/detector sensor 385 may include an emitter and a detector as a probe.

The Hall sensor 381 may include Hall circuitry, for example, disposed in the device 310 that interacts with a magnet, for example, disposed in the flap 340. As shown, a magnet may interact with the Hall circuitry to alter current and hence a voltage (e.g., a Hall voltage). Circuitry may monitor the Hall voltage, for example, to determine an orientation of the flap 340. As an example, a magnet may be a relatively thin, disc shaped permanent magnet and Hall circuitry may include a conductive plate. In such an example, the magnet may interact with the conductive plate.

As an example, a magnet may provide an attraction force with respect to metal (e.g., in a cover, in a device, etc.), which may help to retain a flap in an orientation. For example, where a piece of metal is in a cover, flipping a flap to an open position may provide for attraction between a magnet in the flap and the piece of metal to help retain the flap in the open position. As another example, where a piece of metal is in a device, flipping a flap to a closed position may provide for attraction between the magnet in the flap and the piece of metal to help retain the flap in the closed position. As an example, a magnet may optionally help to retain a flap in an open position and to retain a flap in a closed position. As an example, a cover may include one or more pieces of metal, one or more magnets, or one or more pieces of metal and one or more magnets. As an example, a cover may include two magnets oriented for attraction to each other, for example, where a flap of the cover includes one of the magnets and where a portion of the cover includes the other of the magnets. In such an example, the magnets may interact to help retain the flap in an open orientation. As an example, a magnet in a flap may help to retain the flap in an orientation or orientations and may interact with sensor circuitry (e.g., via a probe, etc.).

The capacitive sensor 382 of FIG. 3 includes, for example, electrodes where presence of a conductor (e.g., a conductor operatively coupled to a ground or other electrical circuit) alters a field between the electrodes in a manner that may be sensed via a change in collected charge. As an example, the flap 340 may include a conductor and circuitry may monitor collected charge, for example, to determine an orientation of the flap 340.

The pressure sensor 383 of FIG. 3 includes, for example, one or more piezoelectric elements and a diaphragm where pressure on the diaphragm distorts at least one of the one or more piezoelectric elements. As an example, the flap 340 may include a protrusion (e.g., domed or of another shape) that can interact with a diaphragm of the pressure sensor 383. Circuitry may monitor the one or more piezoelectric elements, for example, to determine an orientation of the flap 340. As an example, a contact switch may be provided, for example, where a protrusion of a flap (e.g., optionally conductive) fits into an opening to cause formation of an electrical contact (e.g., directly or indirectly) that is part of the contact switch's circuitry (e.g., cause it to be in an "on" or in an "off" state).

The sonic sensor 384 of FIG. 3 includes, for example, a microphone, for example, coupled to circuitry that may be configured to classify or detect certain "noise". For example, ambient noise may be detected. As an example, with the flap 340 in a first orientation, it may cover the microphone (e.g., or an opening associated with the microphone) and in a second orientation, it may expose the microphone (e.g., or opening) such that the microphone may respond differently to ambient noise. Circuitry may monitor noise, for example, to determine an orientation of the flap 340.

The emitter/detector sensor 385 of FIG. 3 includes, for example, an emitter and a detector where the emitter may emit electromagnetic energy (e.g., visible, IR, etc.) and where the detector may detect reflected electromagnetic energy. In such an example, the flap 340 may include a surface that reflects the emitted electromagnetic energy such that it is reflected to the detector. As an example, such a surface may include characteristics germane to reflecting the energy (e.g., a polished surface, a mirror surface, etc.). Circuitry may monitor detected energy (e.g., presence thereof, lack thereof, amount, etc.), for example, to determine an orientation of the flap 340.

As shown in the example of FIG. 3, the device 310 may include one or more sensors 302, logic 304 and camera circuitry 306, for example, which are operatively coupled. In such an example, an orientation of the flap 340 may be determined and one or more actions triggered. For example, orientation of the flap 340 may control operational state of the device 310, for example, by transitioning from one operational state to another, etc.

As an example, a device may include multiple sensors, for example, where a first sensor may sense orientation of a flap (e.g., whether the flap covers the first sensor or not) and a second sensor may sense orientation of a cover to which the flap may be coupled, a portion thereof, etc. (e.g., whether the cover covers the second sensor or not). In such an example, logic may optionally determine a state of camera circuitry based on information associated with one sensor or multiple sensors (e.g., sensed information). For example, where sensors provide information that indicate that a cover is in a closed orientation and a flap is in an open orientation, camera circuitry may be transitioned from a dormant state to an active state; whereas, if information indicates that the cover is in an open orientation, such camera circuitry may remain in a dormant state (e.g., optionally capable of activation via receipt of input via a user interface, etc.). As an example, where a device includes multiple sensors, the multiple sensors may include sensors of different types (e.g., consider one or more of the types of sensors in FIG. 3).

As an example, a device may include a cover that includes a flap where a user can trigger a camera application of the device by orienting the flap. As an example, FIG. 3 also shows a device 390 that includes a sensor A and a sensor B. In such an example, the device 390 may be configured, for example, as follows: sensors A and B are both in a first state (filled circles) to indicate that neither a device cover nor a flap are open; sensors A and B are both in a second state (open circles) to indicate that a device cover and a flap are open, for example, where a camera may remain in a dormant state; sensor A is in the first state (closed circle) and sensor B is in the second state (open circle) to indicate that a camera application is to be triggered (e.g., to place a camera in an active state), for example, where a device cover is closed and a flap is open; and sensors A and B are both in the first state (filled circles) from sensor B only being in the second state (open circle) to indicate that a camera application is to be closed (e.g., and the device optionally returned to a prior operational state), for example, which may occur upon closing an open flap (e.g., where a device cover remains closed).

As an example, a device may include a small dog ear tab that folds down to reveal a camera and to trigger a camera application, for example, responsive to information provided by a sensor. In such an example, the dog ear flap may be opened quickly with one finger to reveal the camera where opening of the dog ear flap also initiates a camera application (e.g., a camera active mode). As an example, when the dog ear is flipped back, the camera application may be exited and the device returned to a prior operational state (e.g., a different application, etc.).

Figure 4:
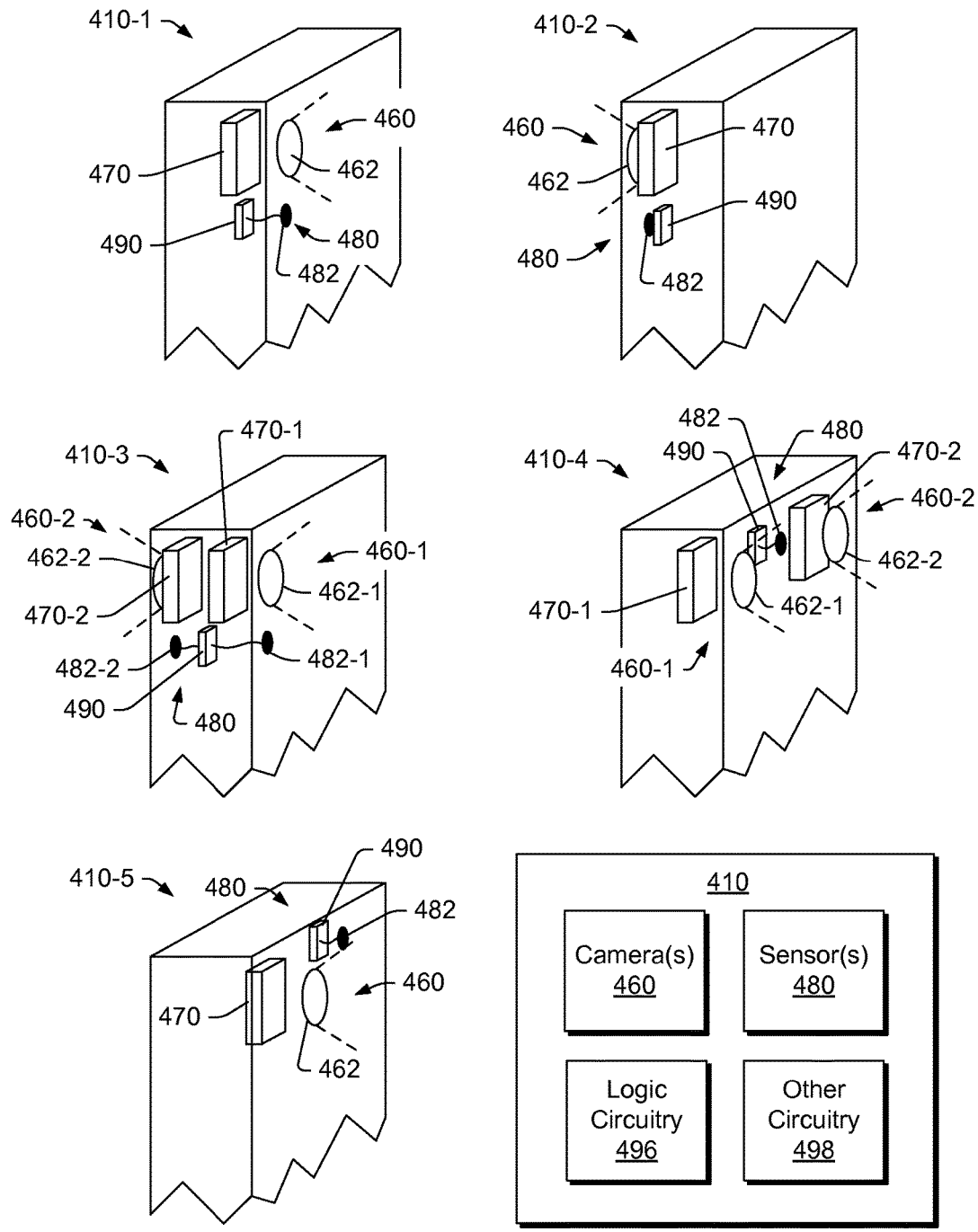
FIG. 4 is a diagram of examples of devices.

FIG. 4 shows various examples of devices 410-1, 410-2, 410-3, 410-4 and 410-5, where each includes one or more cameras 460, one or more sensors 480, logic circuitry 496 and other circuitry 498.

As shown, the example device 410-1 includes two opposing sides, a camera 460 that includes a lens 462 directed outwardly from one of the sides (e.g., a back side) and camera circuitry 470 as well as a sensor 480 that includes a probe 482 and sensor circuitry 490. As shown, the example device 410-2 includes two opposing sides, a camera 460 that includes a lens 462 directed outwardly from one of the sides (e.g., a front side) and camera circuitry 470 as well as a sensor 480 that includes a probe 482 and sensor circuitry 490.

As shown, the example device 410-3 includes two opposing sides, a camera 460-1 that includes a lens 462-1 directed outwardly from one of the sides (e.g., a back side) and camera circuitry 470-1, a camera 460-2 that includes a lens 462-2 directed outwardly from one of the sides (e.g., a front side) and camera circuitry 470-2 as well as a sensor 480 that includes a probe 482-1 and a probe 482-2 and sensor circuitry 490.

As shown, the example device 410-4 includes two opposing sides, a camera 460-1 that includes a lens 462-1 directed outwardly from one of the sides (e.g., a back side) and camera circuitry 470-1, a camera 460-2 that includes a lens 462-2 directed outwardly from one of the sides (e.g., the back side) and camera circuitry 470-2 as well as a sensor 480 that includes a probe 482 and sensor circuitry 490. As an example, such a device may include an additional probe, additional sensor circuitry, etc.

As shown, the example device 410-5 includes two opposing sides, a camera 460 that includes a lens 462 directed outwardly from one of the sides (e.g., a back side) and camera circuitry 470 as well as a sensor 480 that includes a probe 482 and sensor circuitry 490. In the example device 410-5, the lens 462 is shown as being located at a position other than at a corner (see, e.g., the device 410-1).

Figure 5:
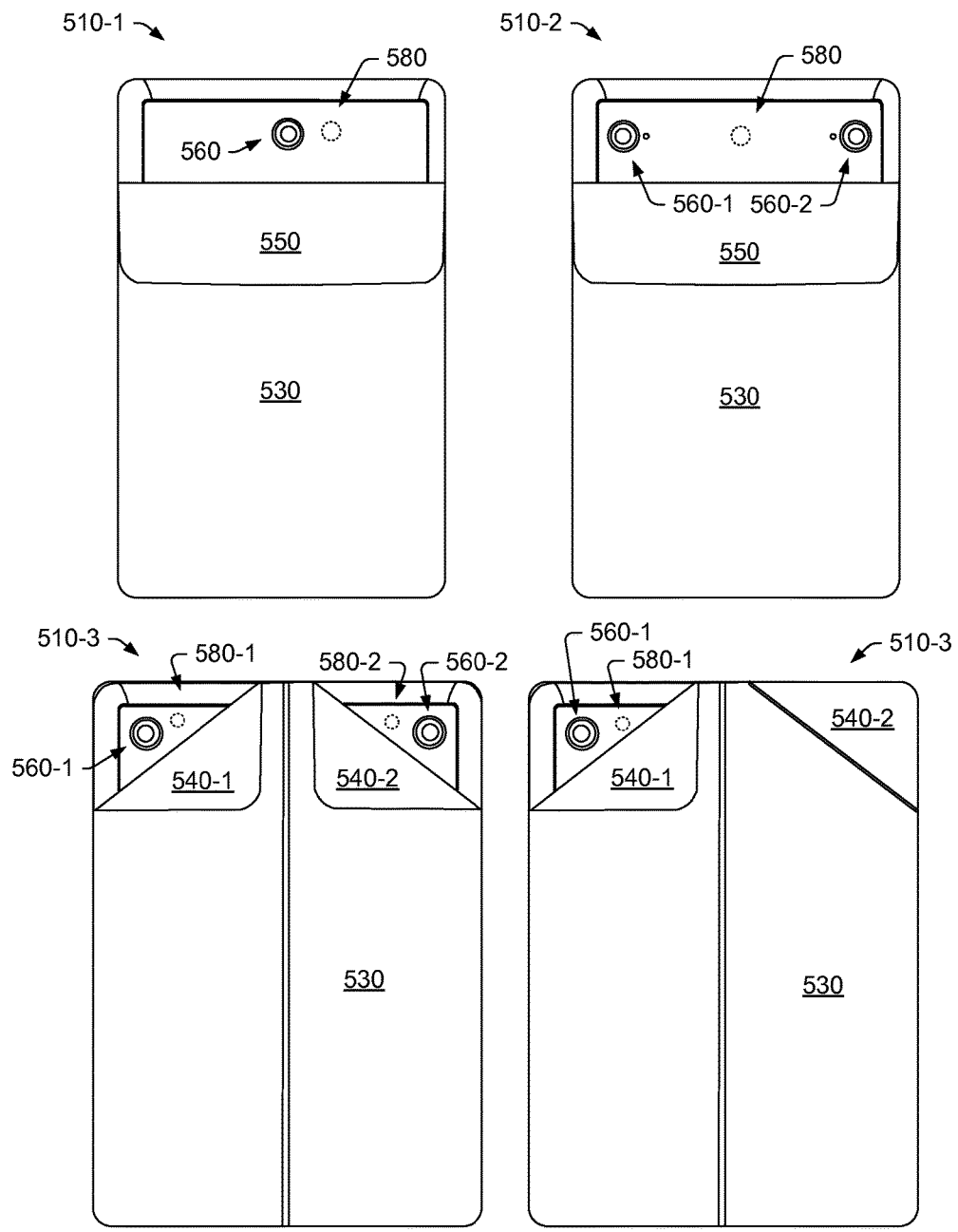
FIG. 5 is a diagram of examples of devices that include at least one flap (e.g., optionally a flap of a cover)

FIG. 5 shows examples of devices 510-1, 510-2 and 510-3. In FIG. 5, the device 510-1 includes a cover 530 that includes a flap 550 as well as a camera 560 and a sensor 580. As shown, the flap 550 has an approximately rectangular shape, which may be oriented in a closed orientation and an open orientation. In such an example, the sensor 580 may sense the orientation of the flap 550 and via control logic cause the camera 560 (e.g., camera circuitry) to transition the camera 560 from a dormant state to an active state or vice versa. As an example, a flap may have a rectangular or other shape and may extend over a portion of a length or width of a device. For example, the flap 550 may be configured to span a portion of the device 510-1 that includes the camera 560 (e.g., where the flap 550 extends to an end but not to opposing edges of the device 510-1).

In FIG. 5, the device 510-2 includes two cameras 560-1 and 560-2 and a sensor 580. As an example, the device 510-2 may be configured for stereo imagery. As an example, the sensor 580 may sense the orientation of the flap 550 and cause the cameras 560-1 and 560-2 to transition from one state to another.

In FIG. 5, the device 510-3 includes a cover 530 with two flaps 540-1 and 540-2, two cameras 560-1 and 560-2 as well as two sensors 560-1 and 560-2. As shown, the flaps 540-1 and 540-2 may independently be oriented, for example, to selectively activate one or both of the cameras 560-1 and 560-2.

As an example, where a device includes at least one camera on a front side (e.g., a front side camera) and at least one camera on a back side (e.g., a back side camera), the device may optionally include one or more flaps on the front side and/or one or more flaps on the back side.

As an example, a flap control mechanism may optionally be enabled or disabled, for example, to suit user preference. In such an example, a flap application may be executable on a processor of a device, for example, to present a graphical user interface for receipt of instructions to enable, disable or otherwise control action associated with one or more flaps. For example, a user may wish to disable a front flap for a front side camera while enabling a back flap for a back side camera. As another example, an option may be available for an override based on a state of a device. For example, if in a phone state, an option may disable flap triggered actions.

Figure 6:
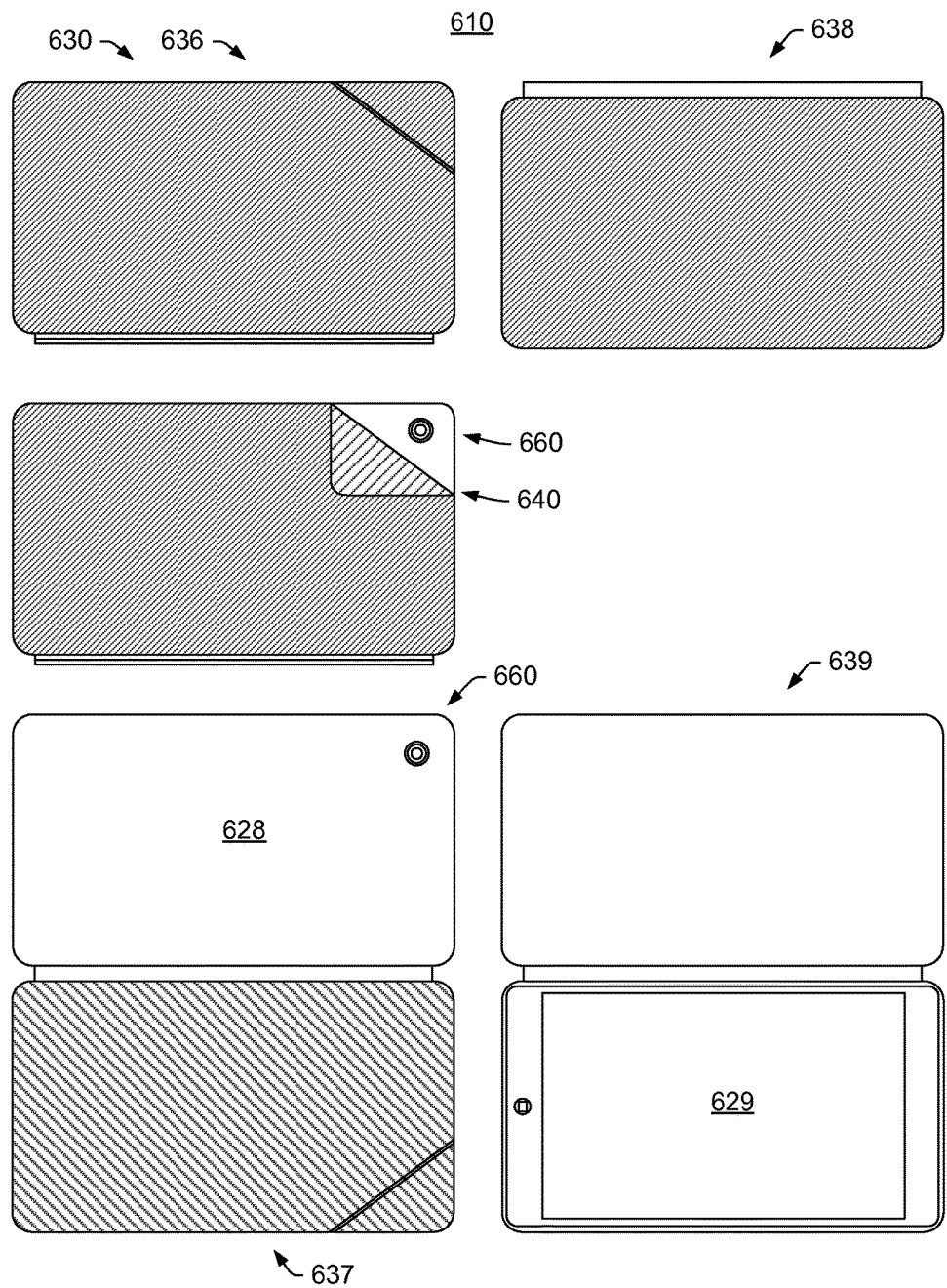
FIG. 6 is a diagram of an example of a device that includes a flap (e.g., optionally a flap of a cover)
Figure 7:
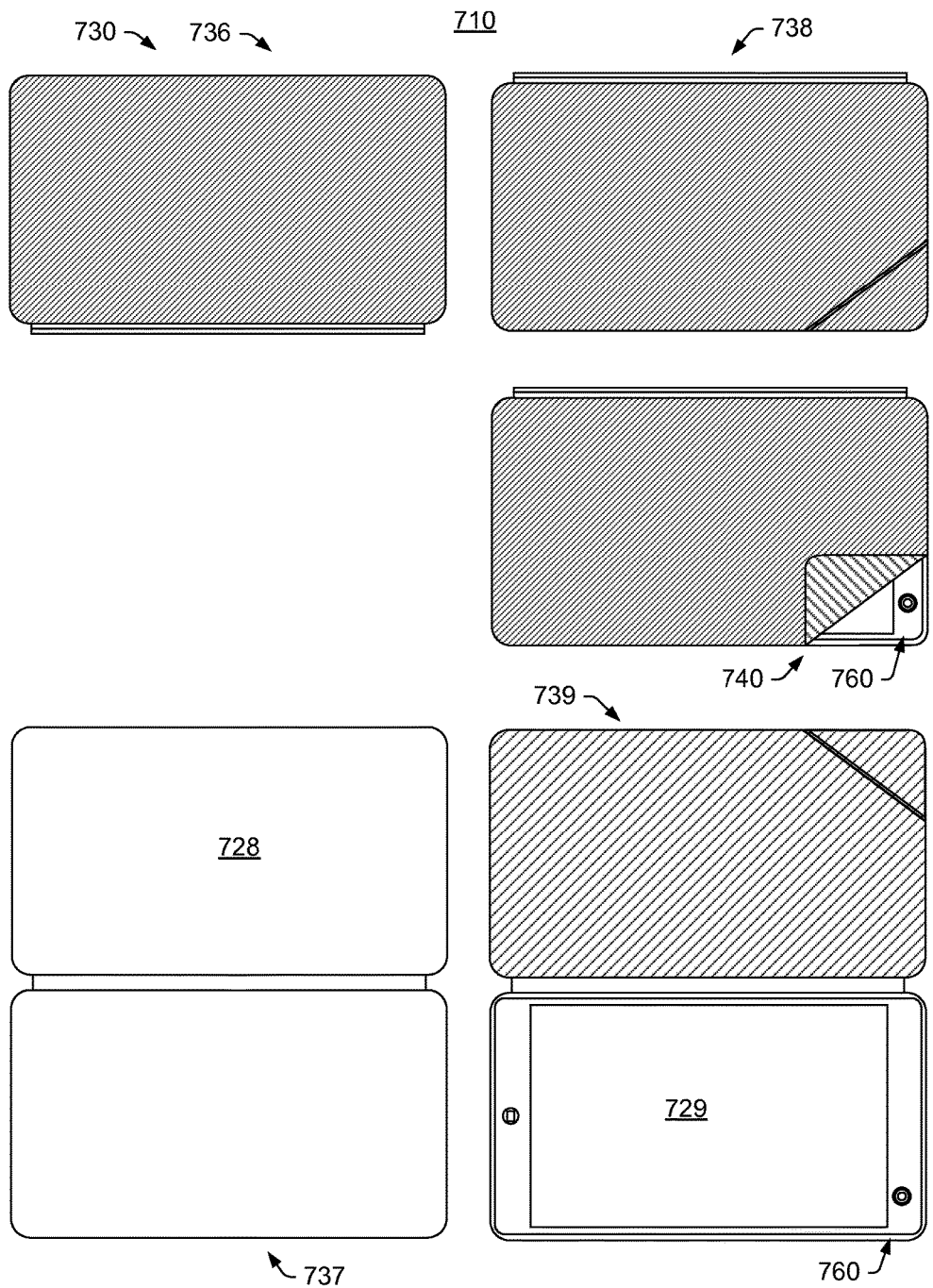
FIG. 7 is a diagram of an example of a device that includes a flap (e.g., optionally a flap of a cover)
Figure 8:
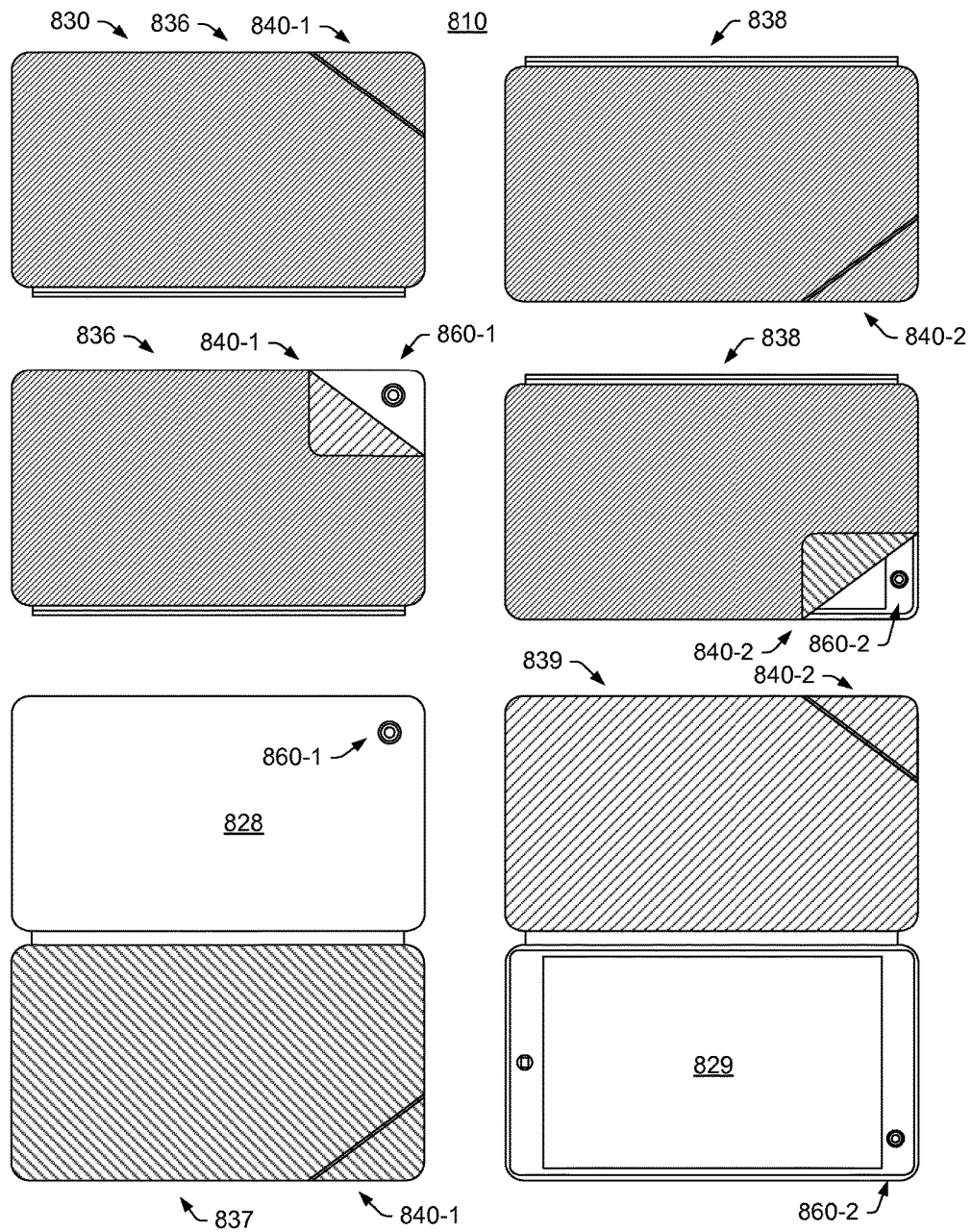
FIG. 8 is a diagram of an example of a device that includes flaps (e.g., optionally flaps of a cover)

FIGS. 6, 7 and 8 show various examples of devices, covers, etc. where the drawings are lined for color (e.g., a color option or options). For example, in FIG. 6, the drawings are lined for color contrast, but no specific colors are to be understood from the linings. However, in an example, one of the colors may be red. For example, a black cover may include flap that has a red side, which in an open orientation, contrasts with the black cover. As another example, a red cover may include a flap that has a black side, which in an open orientation, contrasts with the red cover.

FIG. 6 shows an example of a device 610 that includes a back side 628, a front side 629 and a back side camera 660 where the device 610 is fitted with a folding cover 630 that includes a back side portion with an outward facing side 636 and an inward facing side 637 and a front side portion with an outward facing side 638 and an inward facing side 639. As shown in the example of FIG. 6, the back portion of the cover 630 includes a flap 640. Where the color of the outward facing side 636 differs from the color of the inward facing side 637, opening of the flap 640 may aesthetically show both colors, in contrast.

FIG. 7 shows an example of a device 710 that includes a back side 728, a front side 729 and a front side camera 760 where the device 710 is fitted with a folding cover 730 that includes a back side portion with an outward facing side 736 and an inward facing side 737 and a front side portion with an outward facing side 738 and an inward facing side 739. As shown in the example of FIG. 7, the front portion of the cover 730 includes a flap 740. Where the color of the outward facing side 738 differs from the color of the inward facing side 739, opening of the flap 740 may aesthetically show both colors, in contrast.

FIG. 8 shows an example of a device 810 that includes a back side 828, a front side 829, a back side camera 860-1 and a front side camera 860-2 where the device 810 is fitted with a folding cover 830 that includes a back side portion with an outward facing side 836 and an inward facing side 837 and a front side portion with an outward facing side 838 and an inward facing side 839. As shown in the example of FIG. 8, the back portion of the cover 830 includes a flap 840-1. Where the color of the outward facing side 836 differs from the color of the inward facing side 837, opening of the flap 840 may aesthetically show both colors, in contrast. As shown in the example of FIG. 8, the front portion of the cover 830 includes a flap 840-2. Where the color of the outward facing side 838 differs from the color of the inward facing side 839, opening of the flap 840-2 may aesthetically show both colors, in contrast.

Figure 9:
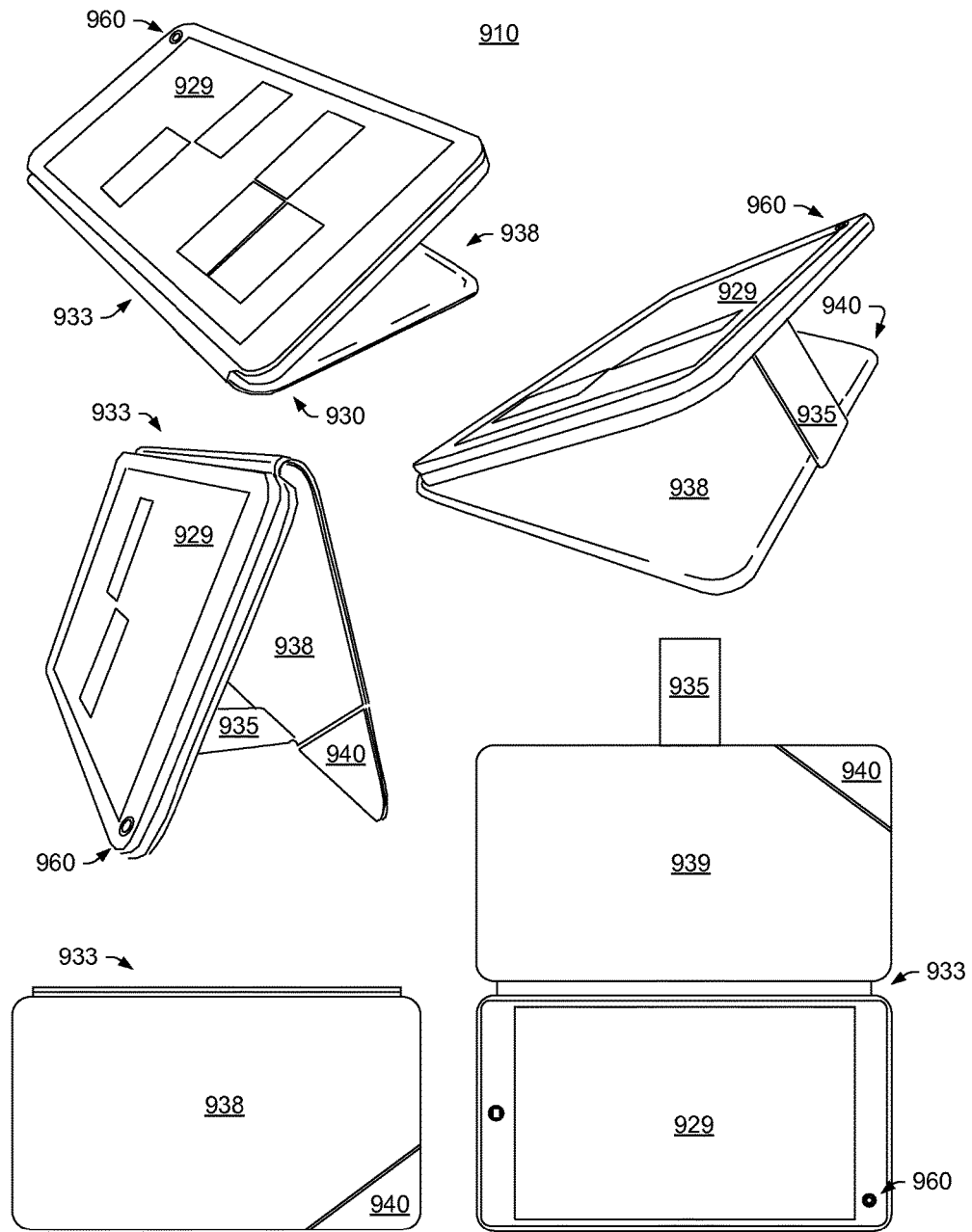
FIG. 9 is a diagram of an example of a device that includes a flap (e.g., optionally a flap of a cover)

FIG. 9 shows an example of a device 910 and a cover 930. As shown, the device 910 includes a front side 929 (e.g., a display side) and a front side camera 960. As shown, the cover 930 includes a front portion 938 that includes a flap 940. As an example, the cover 930 may be coupled to a hinge portion 933 for covering the front side 929 of the device 910 with the front portion 938 of the cover 930. As an example, the cover 930 may include a bridge 935, for example, for orienting the device 910 (e.g., angling the front side 929, tenting, etc.). In the example of FIG. 9, the flap 940 may be selectively opened or closed to expose the camera 960 (e.g., a lens of the camera) where, for example, a sensor may sense the orientation of the flap 940 to determine a state of the camera 960 (e.g., a dormant state, an active state, etc.).

As an example, the device 910 may include multiple states where the camera 960 is exposed. For example, an exposed state due to orientation of the flap 940 and an exposed state due to orientation of the front portion 938 of the cover 930. As an example, one or more sensors may distinguish between these two orientations, for example, where opening of the flap 940 causes the device 910 to enter a camera ready mode while opening of the entire front portion 938 of the cover 930 does not cause the device 910 to enter a camera ready mode. For example, where the device 910 includes a touch sensitive display, the front portion 938 may be sensed as covering the touch sensitive display. As an example, as a touch sensitive display may distinguish x, y coordinates over a planar extent of the display, where the flap 940 exposes (e.g., no longer "touches" a portion of the display, the display itself may be part of sensor circuitry that determines an orientation of the flap 940 (e.g., as a capacitive sensor, as an electromagnetic digitization sensor, etc.).

Figure 10:
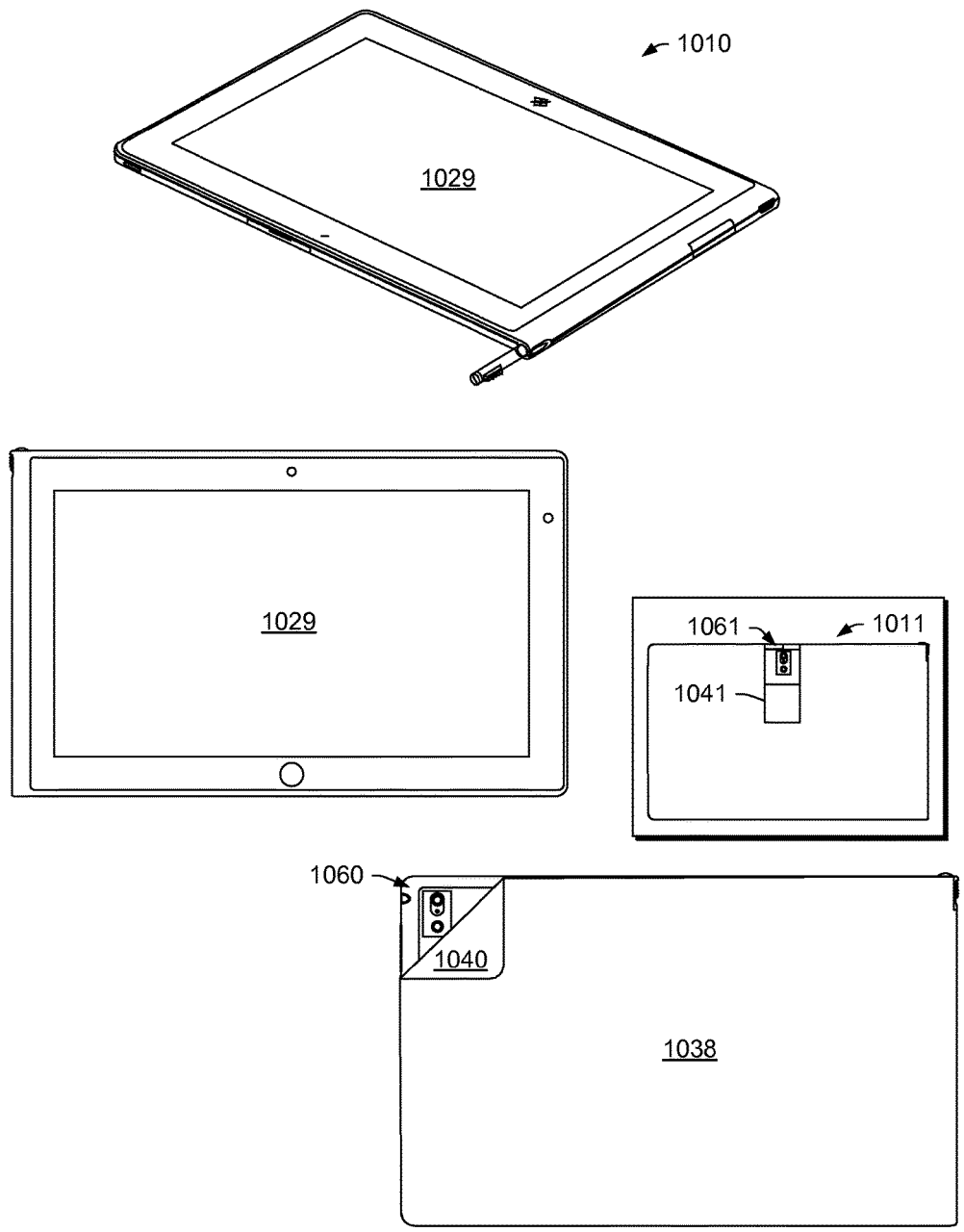
FIG. 10 is a diagram of examples of devices that include a flap (e.g., optionally a flap of a cover)

FIG. 10 shows an example of a device 1010 and a flap 1040. As shown, the device 1010 includes a front side 1029 (e.g., a display side), a back side 1038 and a back side camera 1060. As shown, the back side 1038 includes the flap 1040, which may optionally be part of a cover (e.g., a removable cover) or may optionally be a feature of a housing (e.g., a feature mounted to a back side of a housing of the device 1010). As an example, the flap 1040 may be coupled to a hinge, for example, to selectively open and close the flap 1040 to expose or to cover the camera 1060 (e.g., a lens of the camera). As an example, the device 1010 may include one or more sensors that may sense an orientation of the flap 1040 to determine a state of the camera 1060 (e.g., a dormant state, an active state, etc.). As an example, the device 1010 may be a tablet computing device (e.g., a computing "pad") that includes one or more processors, memory, an operating system, one or more applications, etc. Such a device may include a touchscreen, which may be, for example, configured for input via a stylus (e.g., optionally a stylus with circuitry to interact with electromagnetic digitizer circuitry, which may be, for example, included in a device). As an example, the device 1010 may include multiple cameras. As an example, a tablet computing device may include a back side camera at a more central location (e.g., yet proximate to an edge). In such an example, the device may include a flap coupled to a hinge to cover and to expose the camera (see, e.g., the flap 550 of FIG. 5 and description thereof). For example, FIG. 10 shows an example of a device 1011 that includes a camera 1061 and an example of a flap 1041 at a more central location (a location that differs from that of the flap 1040).

Figure 11:
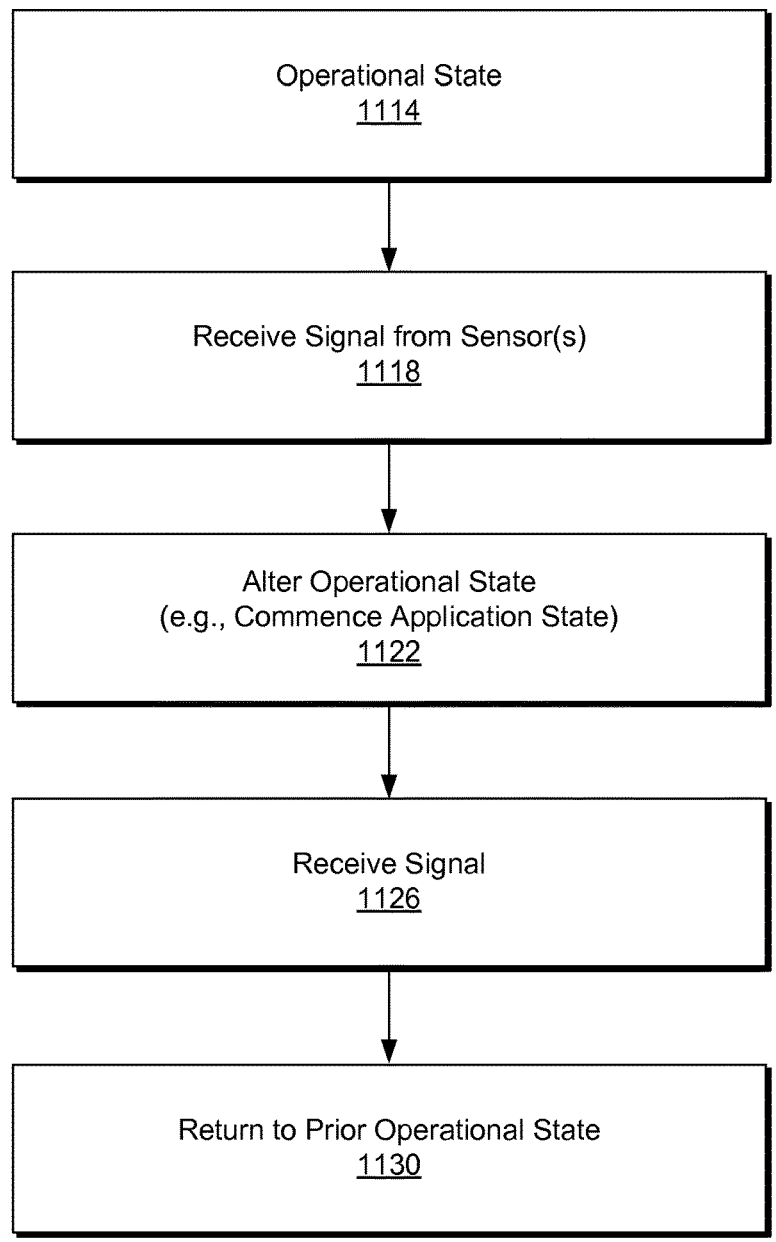
FIG. 11 is a diagram of an example of a method.

FIG. 11 shows an example of a method 1110 that includes an operational state block 1114 for noting an operational state of a device, a reception block 1118 for receiving a signal from a sensor, an alteration block 1122 for altering an operational state of the device based at least in part on a received signal of the reception block 1118, a reception block 1126 for receiving a signal (e.g., which may differ from the signal of the reception block 1118), and a return block 1130 for returning the device to a noted operational state (e.g., optionally a prior operational state) based at least in part on a received signal of the reception block 1126.

As an example, an apparatus can include a processor; memory operatively coupled to the processor; a display operatively coupled to the processor; a camera that includes a lens, an active state and a dormant state; a housing that houses at least the processor and the camera and that includes a surface where the surface comprises an aperture aligned with the lens of the camera; a flap where, in a first orientation, the flap covers the aperture and where, in a second orientation, the flap exposes the aperture; and circuitry that can determine the state of the camera based on the orientation of the flap. In such an example, the apparatus can include a cover that covers the surface of the housing and that includes the flap.

As an example, an apparatus can include circuitry that includes a sensor, for example, such as a Hall sensor, a pressure sensor, a proximity sensor, a sonic sensor, an emitter/detector sensor, a capacitive sensor, etc.

As an example, circuitry that determines the state of a camera based on orientation of a flap can include a switch, which may be, for example, a contactless switch.

As an example, circuitry that determines the state of a camera based on an orientation of a flap may include circuitry (e.g., a conductor such as a conductive plate) that interacts with a magnet, for example, such as a permanent magnet (e.g., carried by the flap).

As an example, an apparatus can include at least one magnet that provides an attractive force to help retain a flap in at least one of a first orientation and a second orientation (e.g., where the flap covers a camera lens in the first orientation and where the flap exposes the camera lens in the second orientation).

As an example, an information handling apparatus can include a processor; memory operatively coupled to the processor; a planar touchscreen display operatively coupled to the processor; a camera that includes a lens, an active state and a dormant state; a housing that houses at least the processor and the camera and that includes an approximately planar surface disposed approximately parallel to the planar touchscreen display where the surface includes an aperture aligned with the lens of the camera; a flap where, in a first orientation, the flap covers the aperture and where, in a second orientation, the flap exposes the aperture; and circuitry that can determine the state of the camera based on the orientation of the flap. In such an example, the apparatus may include a cover that covers the approximately planar surface of the housing and that includes the flap.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. A computer-readable storage medium may be referred to as being a non-transitory storage medium.

Figure 12:
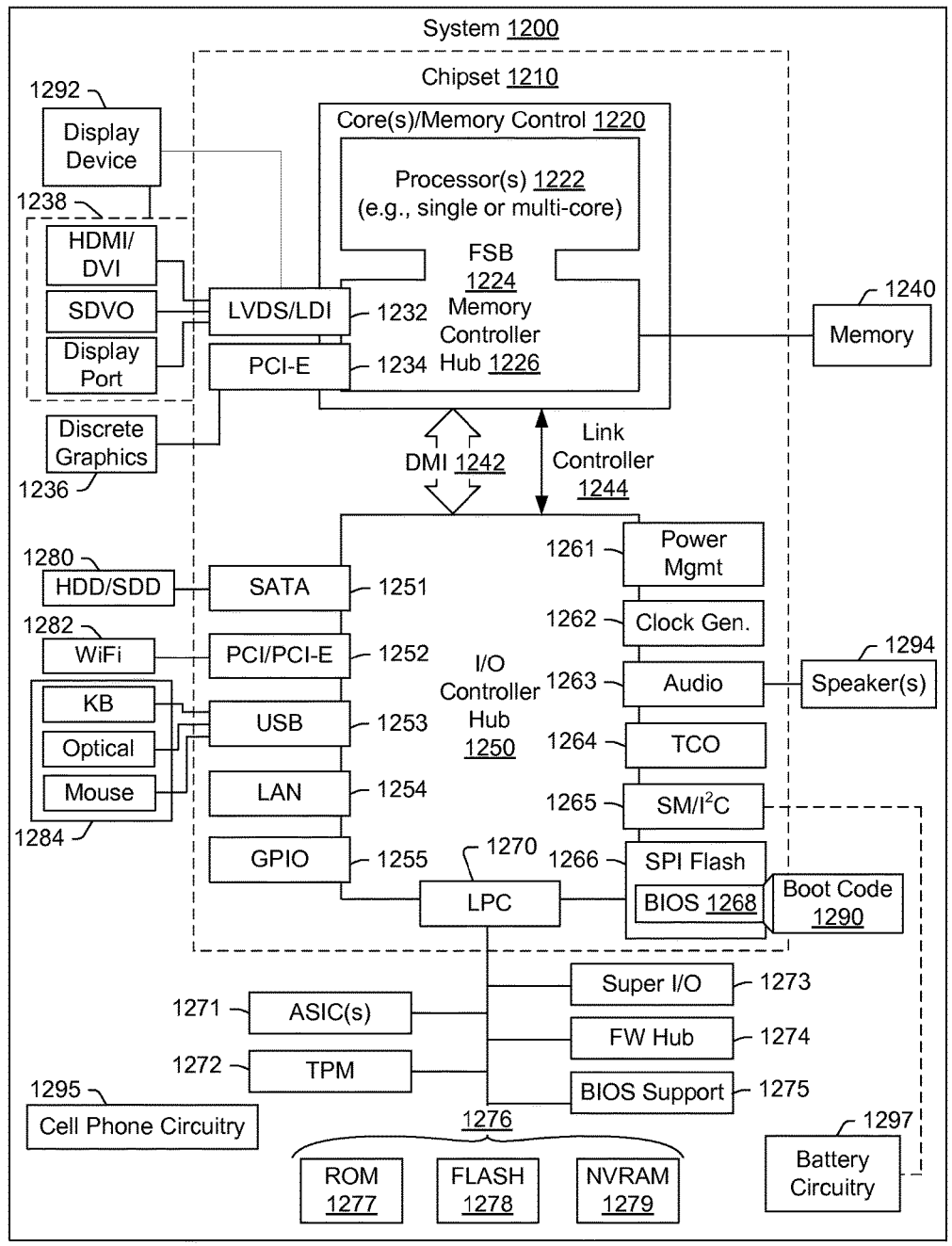
FIG. 12 is a diagram of an example of a system that includes one or more processors.

While various examples of circuits or circuitry have been discussed, FIG. 12 depicts a block diagram of an illustrative computer system 1200. The system 1200 may be, for example, a desktop computer system, such as one of the ThinkCentre® or ThinkPad® series of personal computers sold by Lenovo (US) Inc. of Morrisville, N.C. or, for example, a workstation computer, such as the ThinkStation®, which are sold by Lenovo (US) Inc. of Morrisville, N.C. As an example, a computing device, an information handling device, or other machine may include other features and/or only some of the features of the system 1200. As an example, a device such as one of the devices of the various figures may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a touch-screen or sensor display (e.g., configured for receipt of input using a stylus, a finger, etc.). As described herein, a touch-screen or sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. As described herein, a computing device, an information handling system, etc. may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200 (see, e.g., the devices 120, 120, etc.). Also shown in FIG. 12 is battery circuitry 1297, which may provide one or more battery, power, etc., associated features (e.g., optionally to instruct one or more other components of the system 1200). As mentioned, a SMBus may be operable via a LPC (see, e.g., the LPC interface 1270), via an I²C interface (see, e.g., the SM/I²C interface 1265), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a processor;
memory operatively coupled to the processor;
a touchscreen display operatively coupled to the processor;
a network interface operatively coupled to the processor;
a camera that comprises a lens;
an operating system as instructions stored in the memory and executable by the processor to establish an operating system environment;
applications as instructions stored in the memory that execute within the operating system environment to establish corresponding application states wherein the applications comprise a camera application to establish a camera state;
a housing that houses at least the processor and the camera and that comprises a surface wherein the surface comprises an opening for the lens of the camera;
a removable cover that covers at least a portion of the surface of the housing and that comprises a flap wherein the removable cover comprises a closed orientation with respect to the touchscreen display and an open orientation with respect to the touchscreen display, and wherein the flap comprises a closed orientation with respect to the opening and an open orientation with respect to the opening;
a first sensor that senses orientation of the flap;
a second sensor that senses orientation of the removable cover; and
a flap control mechanism that selectably enables circuitry that switches from an existing application state to the camera state responsive to a transition of the flap from the closed orientation to the open orientation wherein the removable cover is in a closed orientation and that selectably disables the circuitry that switches to override a switch from an existing application state to the camera state responsive to a transition of the flap from the closed orientation to the open orientation wherein the removable cover is in a closed orientation, and wherein the circuitry that switches is disabled wherein the removable cover is in an open orientation.

2. The apparatus of claim 1 comprising a phone.

3. The apparatus of claim 1 wherein the applications comprise a phone application to establish a phone state.

4. The apparatus of claim 1 wherein the applications comprise a browser application to establish a browser state.

5. The apparatus of claim 1 wherein the network interface comprises a wireless network interface.

6. The apparatus of claim 1 wherein the network interface comprises a cellular network interface.

7. The apparatus of claim 1 wherein the flap comprises a first side that comprises a color and a second side that comprises a different color.

8. The apparatus of claim 3 wherein the existing application state comprises the phone state.

9. The apparatus of claim 4 wherein the existing application state comprises the browser state.

10. The apparatus of claim 7 wherein the color is red and the different color is black.

11. The apparatus of claim 9 wherein the browser state accesses the Internet via the network interface.

12. A method comprising:
within an operating system environment established by executing instructions of an operating system on a processor of a device, executing instructions of an application to establish an application state;
via a first sensor, determining that a removable cover is in a closed orientation with respect to a surface of a housing of the device;
via a second sensor, detecting a transition of a flap of the removable cover from a closed state to an open state with respect to a camera lens opening in the surface of the housing of the device wherein the removable cover covers at least a portion of the surface;
responsive to the detecting, switching from the application state as an existing application state to a camera state by executing a camera application within the operating system environment; and
rendering a graphical user interface to a display of the device for receipt of instructions to selectively enable and to selectively disable the switching as a control action associated with the flap, wherein the switching as a control action is disabled wherein the removable cover is in an open orientation with respect to the surface of the housing of the device.

13. The method of claim 12 wherein the device comprises a phone.

14. The method of claim 12 wherein the application comprises a phone application.

15. The method of claim 12 wherein the application comprises a browser application.

16. The method of claim 12 wherein the flap comprises a first side that comprises a color and a second side that comprises a different color.

17. The method of claim 14 wherein the phone application accesses a cellular network via a cellular network interface of the device.

18. The method of claim 15 wherein the browser application accesses the Internet via a network interface of the device.

19. The method of claim 16 wherein the color is red and the different color is black.

20. One or more non-transitory computer-readable storage media that comprise computer-executable instructions to instruct a device to:
within an operating system environment established via execution of instructions of an operating system on a processor of a device, execute instructions of an application to establish an application state;
based at least in part on output of a first sensor, determine that a removable cover is in a closed orientation with respect to a surface of a housing of the device;
based at least in part on output of a second sensor, detect a transition of a flap of the removable cover from a closed state to an open state with respect to a camera lens opening in the surface of the housing of the device wherein the removable cover covers at least a portion of the surface;
responsive to the transition, switch from the application state as an existing application state to a camera state via execution of a camera application within the operating system environment; and
render a graphical user interface to a display of the device for receipt of instructions to selectively enable and to selectively disable the switch as a control action associated with the flap, wherein the switch as a control action is disabled wherein the removable cover is in an open orientation with respect to the surface of the housing of the device.

* * * * *